United States Patent [19]

Watanabe et al.

[11] Patent Number: 5,150,029
[45] Date of Patent: Sep. 22, 1992

[54] METHOD AND APPARATUS FOR CONTROLLING THE MAGNETIC FLUX OF AN INDUCTION MOTOR

[75] Inventors: Eiji Watanabe; Tsugutoshi Ohtani, both of Yukuhashi, Japan

[73] Assignee: Kabushiki Kaisha Yaskawa Denki Seisakusho, Kitakyushu, Japan

[21] Appl. No.: 445,675

[22] PCT Filed: Mar. 20, 1989

[86] PCT No.: PCT/JP89/00296
§ 371 Date: Nov. 17, 1989
§ 102(e) Date: Nov. 17, 1989

[87] PCT Pub. No.: WO89/09512
PCT Pub. Date: Oct. 5, 1989

[30] Foreign Application Priority Data

Mar. 26, 1988 [JP] Japan ................................. 63-72572

[51] Int. Cl.[5] .............................................. H02P 5/40
[52] U.S. Cl. .................................................. 318/800
[58] Field of Search .......... 318/800, 803, 805, 807–811

[56] References Cited

U.S. PATENT DOCUMENTS

| | | | |
|---|---|---|---|
| 4,330,741 | 5/1982 | Nagase et al. | 318/803 |
| 4,503,376 | 3/1985 | Okuyama | 318/802 |
| 4,862,343 | 8/1989 | Nomura et al. | 318/802 |

*Primary Examiner*—David Smith, Jr.
*Attorney, Agent, or Firm*—Jordan and Hamburg

[57] ABSTRACT

This invention relates to an induction motor magnetic flux operation method in a vector control device in which a primary current is supplied to the induction motor in response to an excitation current command value and a torque current command value and the frequency is controlled on the basis of the magnetic flux operated from the voltage and current applied on the motor, characterized in that, when the magnetic flux is operated on the basis of the voltage, current on the motor and a magnetic flux command signal by using a primary delay circuit, the time constant of the primary delay circuit is set equal to that of the secondary circuit of the motor. According to this invention, it is possible to minimize the phase error with respect to the true secondary magnetic flux included in the secondary magnetic flux value, which leads to an accurate torque control.

2 Claims, 2 Drawing Sheets

METHOD AND APPARATUS FOR CONTROLLING THE MAGNETIC FLUX OF AN INDUCTION MOTOR

FIELD OF THE INVENTION

The present invention relates to a method and apparatus for controlling the magnetic flux of an induction motor for use in carrying out a vector control by detecting the torque current component from the voltage and current applied on the motor.

BACKGROUND OF THE INVENTION

A method is known for producing the secondary linkage magnetic flux of an induction motor by using a primary delay circuit with the voltage and current on the motor and a magnetic flux command value as inputs.

For example, in Japanese Laid-Open Patent Publication No. 57-201870 previously disclosed by the present applicant, a method has been employed in which a secondary induced voltage is obtained by reducing the impedance voltage of an induction motor from the terminal voltage thereof, a voltage obtained by adding to the secondary induced voltage a voltage corresponding to the excitation command current producing by an excitation command is derived and the derived voltage is integrated by a primary delay integration.

However, the above conventional method has had the disadvantage that the effect of the parameters of the motor on the magnetic flux operation value, especially that of the primary resistance varying depending on temperatures, becomes large at low-frequencies.

SUMMARY OF THE INVENTION

Accordingly, an object of the present invention is to reduce the increase in phase error with respect to the magnetic flux operation characteristics of an induction motor by re-investigating the characteristics of magnetic flux operation value on the basis of evaluation of a torque current feedback or magnetic flux orientation type torque control employed for carrying out a vector control.

To achieve the above object, the induction motor magnetic flux production method according to the present invention is characterized as follows. That is, in a vector control device in which a primary current is supplied to the induction motor in response to an excitation current command value and a torque current command value and the frequency is controlled on the basis of the magnetic flux operated from the voltage and current applied on the motor, when the magnetic flux is controlled as a function of the voltage, current on the motor and a magnetic flux command signal by using a primary delay circuit, the time constant of the primary delay circuit is set equal to that of the secondary circuit of the motor.

DESCRIPTION OF THE PREFERRED EMBODIMENT

One of the first characteristics required for the magnetic flux vector even for the torque current feedback and magnetic flux orientation type vector controls, is the coincidence in phase between the actual secondary linkage magnetic flux and its operation value and the next required characteristic is the coincidence between the magnetic flux amplitudes.

Therefore, in the present invention, effort has been exercised to reduce the phase error of the magnetic flux operation value at low frequencies, particularly by taking notice of the characteristics of magnetic flux operation value in a motor constrained state brought about at a critical low frequency. For example, the torque current it in the torque current feedback type vector control may be operated as follows:

$$I_t = (i_1 \times \Phi_2)/|\Phi_2| \tag{1}$$

Wherein
$i_1$: primary current vector
$\Phi_2$: secondary linkage magnetic flux vector
$|\Phi_2|$: amplitude of secondary linkage magnetic flux vector As will be seen from the equation (1), the primary current $i_1$ can be directly detected and the magnetic flux can be expressed by $\Phi_2/|\Phi_2|$ showing a favorable phase characteristic of the unit vector.

In the present invention, the characteristics of the operation magnetic flux vector has been investigated especially at low-frequencies at which the operation error increases, so as to improve them and particularly, an attempt has been made to reduce phase error in a motor constrained state.

Figure 2:
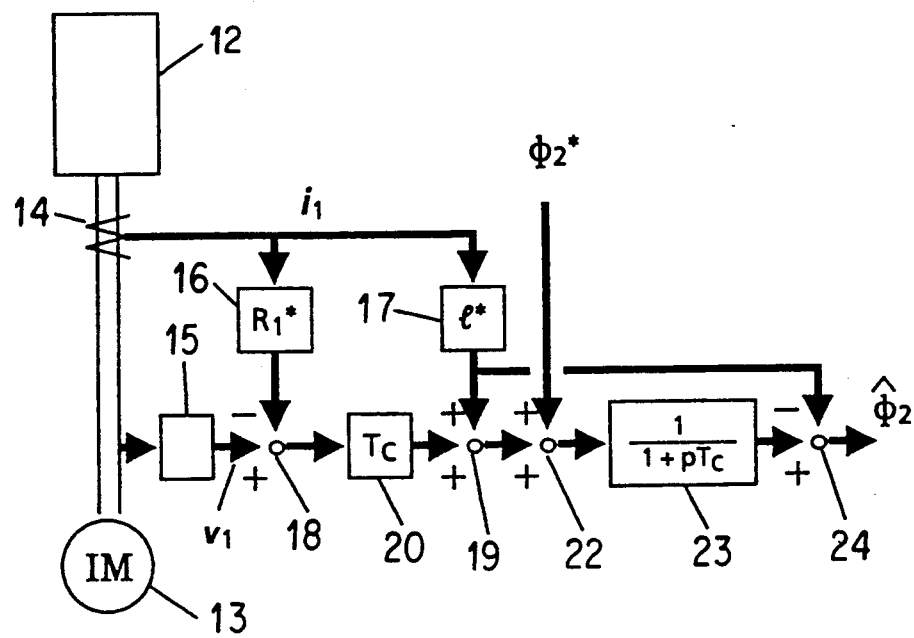
FIG. 2 is a block diagram of an example of a magnetic flux operation circuit and FIG. 3 is a vector diagram of a secondary flux.

FIG. 2 is a block diagram of a magnetic flux control circuit, wherein reference numeral 12 designates an inverter and reference numeral 13 designates an induction motor. The current i flowing through the induction motor 13 is detected by a current detector 14 and the voltage $v_1$ is detected by a voltage detector 15. Reference numerals 16, 17 and 20 designate constant devices, reference numerals 18 and 24 designate deductors, reference numerals 19 and 22 designate adders and reference numeral 23 designates a primary delay circuit. In the block diagram of FIG. 2, a secondary linkage magnetic flux $\hat{\Phi}_2$ is control by the following equation:

$$\hat{\Phi}_2 = \frac{1}{1 + pT_c} \Phi_2^* + \frac{T_c}{1 + pT_c}(v_1 - R_1^* i_1 - l^* p i_1)$$

$$= \frac{1}{1 + pT_c} \Phi_2^* + \frac{T_c}{1 + pT_c}(v_1 - R_1^* i_1) - \left(1 - \frac{1}{1 + pT_c}\right) l^* i_1$$

$$= \frac{1}{1 + pT_c} \{\Phi_2^* + T_c(v_1 - R_1^* i_1) + l^* i_1\} - l^* i_1$$

provided that p is a differential operator.

In a steady-state, the operation error in the above equation is expressed by the following equation (2) provided that $p = j\omega_1$.

$$\hat{\Phi}_2 = \frac{1}{1 + j\omega_1 T_c} \Phi_2^* + \frac{T_c}{1 + j\omega_1 T_c}(v_1 - R_1^* i_1 - j\omega_1 l^* i_1)$$

and if $e_2 = v_1 - R_1 i_1 - j\omega_1 l i_1$, $\Delta R_1 = R_1 - R_1^*$ and $\Delta l = l - l^*$ then $$\hat{\Phi}_2 = \frac{1}{1 + j\omega_1 T_c} \Phi_2^* + \frac{T_c}{1 + j\omega_1 T_c} (v_1 - R_1^* i_1 - j\omega_1 l^* i_1) \quad (2)$$

$$= \frac{1}{1 + j\omega_1 T_c} \Phi_2^* + \frac{T_c}{1 + j\omega_1 T_c} (e_2 + \Delta R_1 i_1 + j\omega_1 \Delta l i_1)$$

$$= \Phi_2 + \frac{\Phi_2^* - \Phi_2}{1 + j\omega_1 T_c} + \frac{T_c \Delta R_1 i_1}{1 + j\omega_1 T_c} + \frac{j\omega_1 T_c \Delta l i_1}{1 + j\omega_1 T_c}$$

provided that $R_1$: actual value of primary resistance
$R_1^*$: set value of primary resistance
$l$: actual value of leakage inductance
$l^*$: set value of leakage inductance
$T_c$: primary delay constant
$\Phi_2^*$: magnetic flux command (vector quantity)
$\Phi_2$: actual secondary linkage magnetic flux (vector quantity)
$\hat{\Phi}_2$: secondary linkage magnetic flux operation value (vector quantity)
$v_1$: primary voltage (vector quantity)
$e_2$: internally induced voltage (vector quantity)
$\omega_1$: angular frequency ($=2\pi f_1$)
$f_1$: primary frequency
$j$: symbol of imaginary number That is, the equation (2) includes a first term showing the actual value of secondary magnetic flux, a second term showing the difference between the command value and actual value of secondary magnetic flux, a third term showing the error resulting from the set value error of primary resistance and a fourth term resulting from the set value error of leakage inductance.

Figure 3:
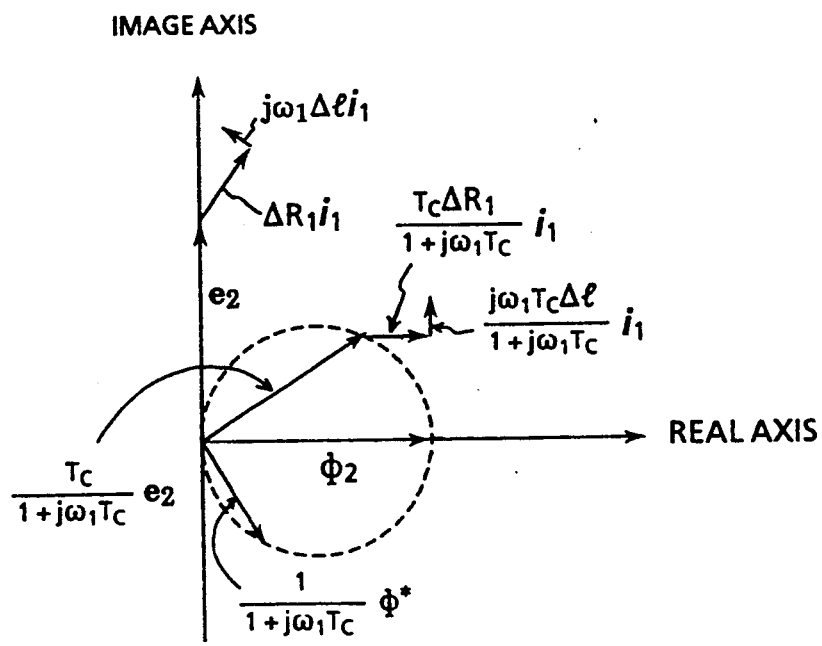

In FIG. 3, a vector diagram of the secondary magnetic flux operated by the equation (2) is shown. In a motor constrained state, when the vector controlling conditions are taken into consideration, the primary current in the equation (2) includes an exciting current and torque current which can be expressed by the following equation (4) and the relationship between the two currents can be expressed by the following equation (5):

$$i_1 = i_m + i_t = \left(1 + j\frac{I_t}{I_m}\right) i_m \quad (4)$$

$$I_t/I_m = \omega_1 T_2 \quad (5)$$

provided that:

$\omega_1$: primary angular frequency
$i_m$: exciting current (vector)
$T_2$: constant of secondary circuit of motor
$I_m$: exciting current (amplitude)
$I_t$: torque current (amplitude)

Further, in a vector controlling state, the second term of the equation (2) becomes zero so that if the equation (4) is substituted into the equation (2), the following equation (6) will result:

$$\hat{\Phi}_2 = \Phi_2 + \frac{T_c}{1 + j\omega_1 T_c} (\Delta R_1 + j\omega_1 \Delta l) \left(1 + j\frac{I_t}{I_m}\right) i_m \quad (6)$$

$$= \hat{\Phi}_2 + \frac{T_c i_m}{1 + (\omega_1 T_c)^2} \left[\left\{\Delta R_1 \left(1 + \omega_1 T_c \frac{I_t}{I_m}\right) + \omega_1 \Delta l \left(\omega_1 T_c - \frac{I_t}{I_m}\right)\right\} + j\left\{\Delta R_1 \left(\frac{I_t}{I_m} - \omega_1 T_c\right) + \omega_1 \Delta l \left(\frac{I_t}{I_m} \omega_1 T_c + 1\right)\right\}\right]$$

In the equation (6), if we put $\Phi_2$ (same in phase as $\Phi_2$) as $\hat{\Phi}_2$(re), the orthogonal component as $\hat{\Phi}_2$(im), and the phase difference between $\hat{\Phi}_2$ and $\Phi_2$ as $\delta$, then they can be expressed by the following equation (7), (8) and (9):

$$\hat{\Phi}_2(re) = \quad (7)$$

$$\Phi_2 \left[1 + \frac{T_c}{M} \cdot \frac{1}{1 + (\omega_1 T_c)^2} \left\{\Delta R_1 \left(1 + \omega_1 T_c \frac{I_t}{I_m}\right) + \omega_1 \Delta l \left(\omega_1 T_c - \frac{I_t}{I_m}\right)\right\}\right]$$

$$\hat{\Phi}_2(im) = \Phi_2 \left[\frac{T_c}{M} \cdot \frac{1}{1 + (\omega_1 T_c)^2} \left\{\Delta R_1 \left(\frac{I_t}{I_m} - \omega_1 T_c\right) + \omega_1 \Delta l \left(\frac{I_t}{I_m} \omega_1 T_c + 1\right)\right\}\right] \quad (8)$$

$$\delta = \tan^{-1} \{\hat{\Phi}_2(im)/\hat{\Phi}_2(re)\} \quad (9)$$

Now, assuming that the time constant of the primary delay circuit be equal to that of the secondary circuit of the motor (that is, $T_c = T_2$), the equations (8) and (9) will be modified to the following equations (10) and (11) from $\omega_1 T_2 = \omega_1 T_c = I_t/I_m$.

$$\hat{\Phi}_2(re) = \Phi_2 \left[1 + \frac{T_c}{M} \Delta R_1\right] \quad (10)$$

$$\hat{\Phi}_2(im) = \Phi_2 \left[\frac{T_c}{M} \omega_1 \Delta l\right] \quad (11)$$

As a result, the term $\hat{\Phi}_2$ (im) of the equation (9) does not include any component regarding the primary resistance error and therefore, no phase difference resulting from the primary resistance error takes place. Further, when we operate the torque current by using the secondary magnetic flux operation value obtained by the equations (10) and (11), the following equation (14) will be obtained from the following equations (12) and (13):

$$i \times \hat{\Phi}_2 = I_t \cdot \hat{\Phi}_2(re) - I_m \cdot \hat{\Phi}_2(im) \quad (12)$$

$$= \Phi_2 \left[ I_t \left(1 + \frac{T_c}{M} \Delta R_1 \right) - I_m \frac{T_c}{M} \omega_1 \Delta l \right]$$

$$= \Phi_2 I_t \left(1 + \frac{T_c \Delta R_1 - \Delta l}{M} \right)$$

$$|\hat{\Phi}_2| = \{\hat{\Phi}_2(re)^2 + \hat{\Phi}_2(im)^2\}^{\frac{1}{2}} \quad (13)$$

$$= \Phi_2 \left\{ \left(1 + \frac{T_c}{M} \Delta R_1 \right)^2 + \left(\frac{T_c}{M} \omega_1 \Delta l \right)^2 \right\}^{\frac{1}{2}}$$

$$= \Phi_2 \left\{ \left(1 + \frac{T_c}{M} \Delta R_1 \right)^2 + \left(\frac{\Delta l}{M} \cdot \frac{I_t}{I_m} \right)^2 \right\}^{\frac{1}{2}} \approx$$

$$\Phi_2 \left(1 + \frac{T_c}{M} \Delta R_1 \right)$$

wherein $$\left(1 + \frac{T_c \Delta R_1}{M} \right) >> \frac{\Delta l}{M I_m} \quad (14)$$

$$I_t = i_1 \times \hat{\Phi}_2 / |\hat{\Phi}_2| = I_t \left(1 - \frac{\Delta l}{M + T_c \Delta R_1} \right) \approx I_t$$

wherein
$\Delta l \ll (M + T_c \Delta R_1)$
$I_t$: actual value of torque current
$I_t$: operation value of torque current and accordingly, it will be seen from the equation (10) that the operation value of the torque current approximates to its true value.

The present invention will now be concretely described by referring to an embodiment show in the drawings.

Figure 1:
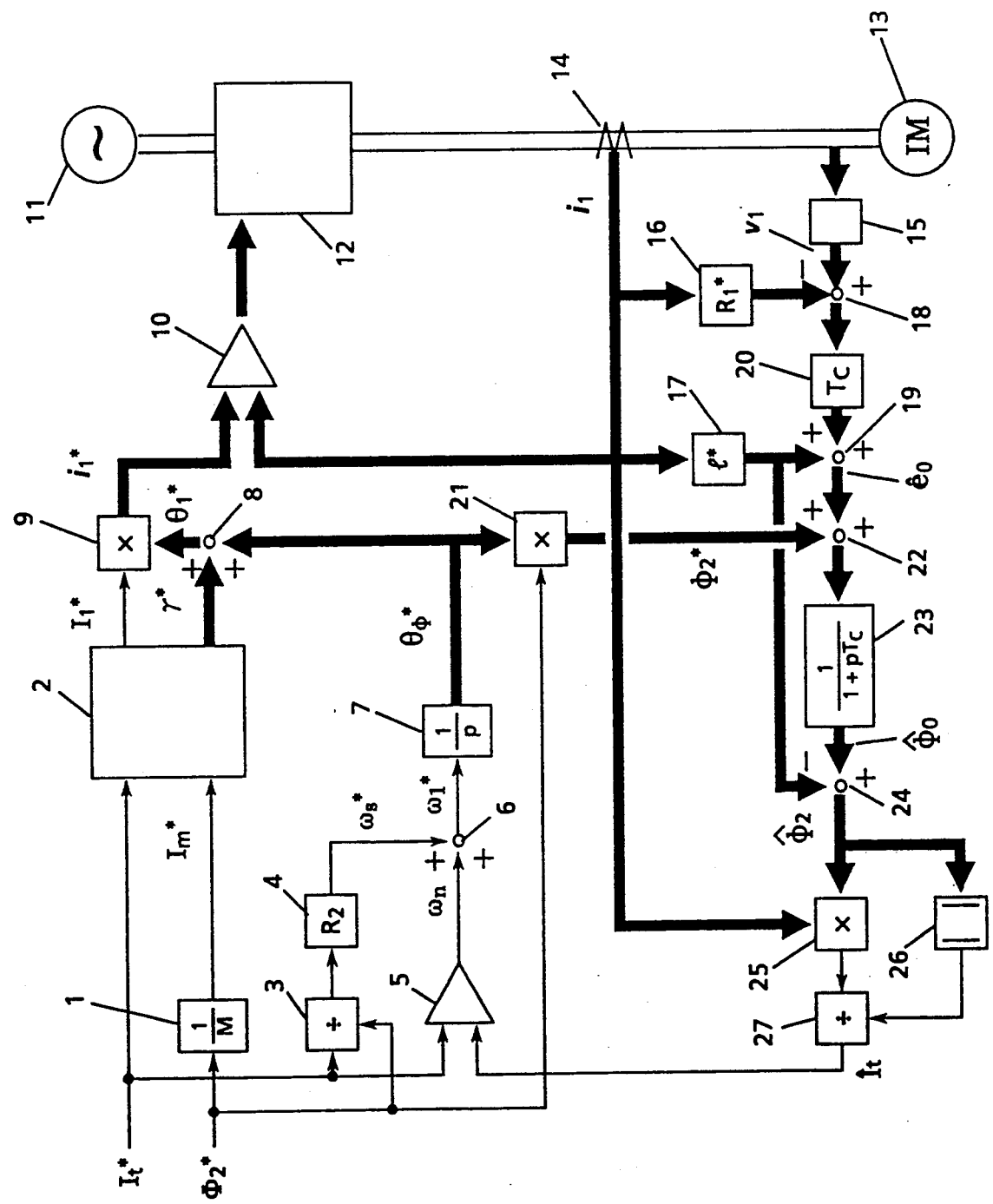
FIG. 1 is a block diagram of one embodiment of the present invention.

FIG. 1 is a block diagram showing an example of how the magnetic flux operation method is performed, wherein reference numeral 11 designates a power supply source, reference numeral 12 designates an inverter, reference numeral 13 designates an induction motor, reference numeral 14 designates a current detector and reference numeral 15 designates a voltage detector.

In FIG. 1, a vector computing element 2 operates the following equations (15) and (16) according to an exciting current command value $I_m^*$ computed by multiplying a set magnetic flux command value $\Phi_2^*$ by a 1/M constant 1, and a torque current command value $I_t^*$ and outputs a primary current command value $I_1^*$ and a phase $\gamma^*$.

$$I_1^* = \sqrt{I_m^{*2} + I_t^{*2}} \quad (15)$$

$$\gamma^* = \tan^{-1}(I_t^*/I_m^*) \quad (16)$$

A multiplier 9 multiplies a phase $\theta_1^*$ of the primary current command by a primary current command value $T_1$ outputted from a multiplier 8 and outputs a primary current command vector $i_1^*$.

A current controller 10 controls the inverter 12 according to the difference between a primary current command vector $i_1^*$ and a primary current $i_1^*$ detected through the current detector 14 and supplies to the motor a current in compliance with the primary current command vector.

A frequency controller 5 outputs a frequency $\omega n$ according to the difference between the torque current command value $I_t^*$ and a torque current operation value $I_t$.

An integrator 7 integrates the sum of a frequency $\omega_n$ outputted from an frequency controller 5 and a frequency command value $\omega_s^*$, that is, a magnetic flux frequency $\omega_1^*$, and outputs a magnetic flux command phase $\theta_\Phi^*$.

Adders 18 and 19 operates the following equation (17) on the basis of a motor terminal voltage $v_1$ detected by the voltage detector 15 and outputs an induced voltage $\hat{e}_0$.

$$\hat{e}_0 = T_c(v_1 - R_1^* i_1) - l^* i_1 \quad (17)$$

A primary delay circuit 23 operates the following equation (18) from a magnetic flux command vector $\Phi_2^*$ outputted from an multiplier 21 and the induced voltage $e_0$ and outputs a magnetic flux $\hat{\Phi}_0$.

$$\hat{\Phi}_0 = \frac{1}{1 + pT_c} (\hat{e}_0 + \Phi_2^*) \quad (18)$$

The computed value of $\hat{\Phi}_0$ is removed of a leakage reactance drop component by a deductor 24 which latter then outputs a secondary magnetic flux $\hat{\Phi}_2$.

Then the torque current $\hat{I}_t$ is obtained by solving the equation (1) with a vector integrator 25, an amplitude computation element 26 and a divider 27 on the basis of the secondary magnetic flux $\hat{\Phi}_2$ and primary current i.

Thus, in the above matter, it is possible to approximate the operation value of torque current $\hat{I}_t$ to the true value.

As described above, it is possible with the present invention to minimize the phase error with respect to the true secondary magnetic flux included in the secondary magnetic flux value in such a manner that the internal induced voltage obtained by deducting from the terminal voltage of the motor the primary resistance drop component and the leakage reactance drop component and the magnetic flux command are synthesized to provide an output and by this output, the secondary magnetic flux is operated through the primary delay circuit with a time constant equal to that of the secondary circuit of the motor.

Therefore, it is possible to operate an accurate torque current on the basis of the secondary magnetic operation value and primary current irrespective of the set errors of primary resistance and leakage reactance.

Further, by using the above-mentioned torque current operation value, a vector control device having a favorable vector control characteristic covering a wide range of speed can be constructed.

INDUSTRIAL FEASIBILITY

The present invention can be utilized in such fields as tension control for paper, film, metal strip or fiber tipically and constant output power control where a favorable torque control characteristic over a wide range of speed is required.

We claim:
1. An induction motor magnetic flux control device for controlling an induction motor having a secondary circuit time constant, comprising:

a current detector and a voltage detector for detecting current flowing in and voltage applied to an induction motor, respectively a first constant device connected to multiply the detected current value of said current detector by a primary resistance value;

a second constant device connected to multiply the detected current value of said current detector by a leakage reactance value;

a first subtracter connected to subtract the output value of said first constant device from the detected voltage value of said voltage detector;

a third constant device connected to multiply the output value of said first subtracter by the secondary circuit time constant of said induction motor;

a first adder connected to add the output value of said second constant device to the output value of said third constant device to obtain an induced voltage value;

a second adder connected to add a magnetic flux command value to the output value of said first adder;

a primary delay circuit connected to input the output value of said second adder and to output a magnetic flux value, said primary delay circuit having a primary delay time constant; and a second subtracter connected to subtract the output value of said second constant device from the output value of said primary delay circuit to thereby obtain a secondary magnetic flux voltage.

2. A control device in accordance with claim 1 wherein the current detector comprises a vector control device for producing a torque component current as a function of the secondary magnetic flux produced by the control device, and wherein the vector control device is responsive to said torque component current, a magnetic flux command and a torque current command.

* * * * *